3,209,925
SILAGE DISTRIBUTOR
Urban J. Coenen, Rte. 1, Kaukauna, Wis.
Filed Mar. 7, 1962, Ser. No. 178,161
5 Claims. (Cl. 214—17)

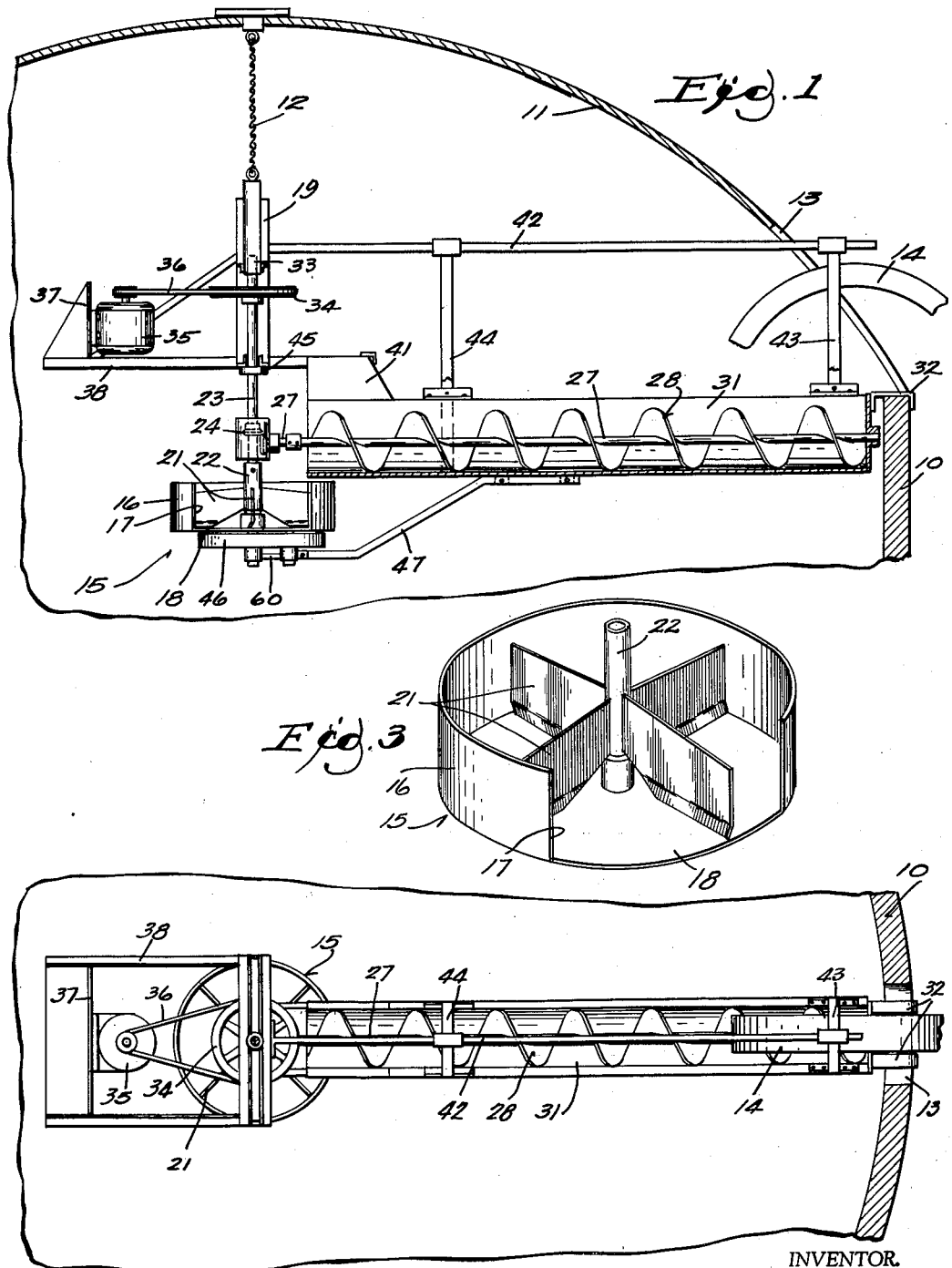

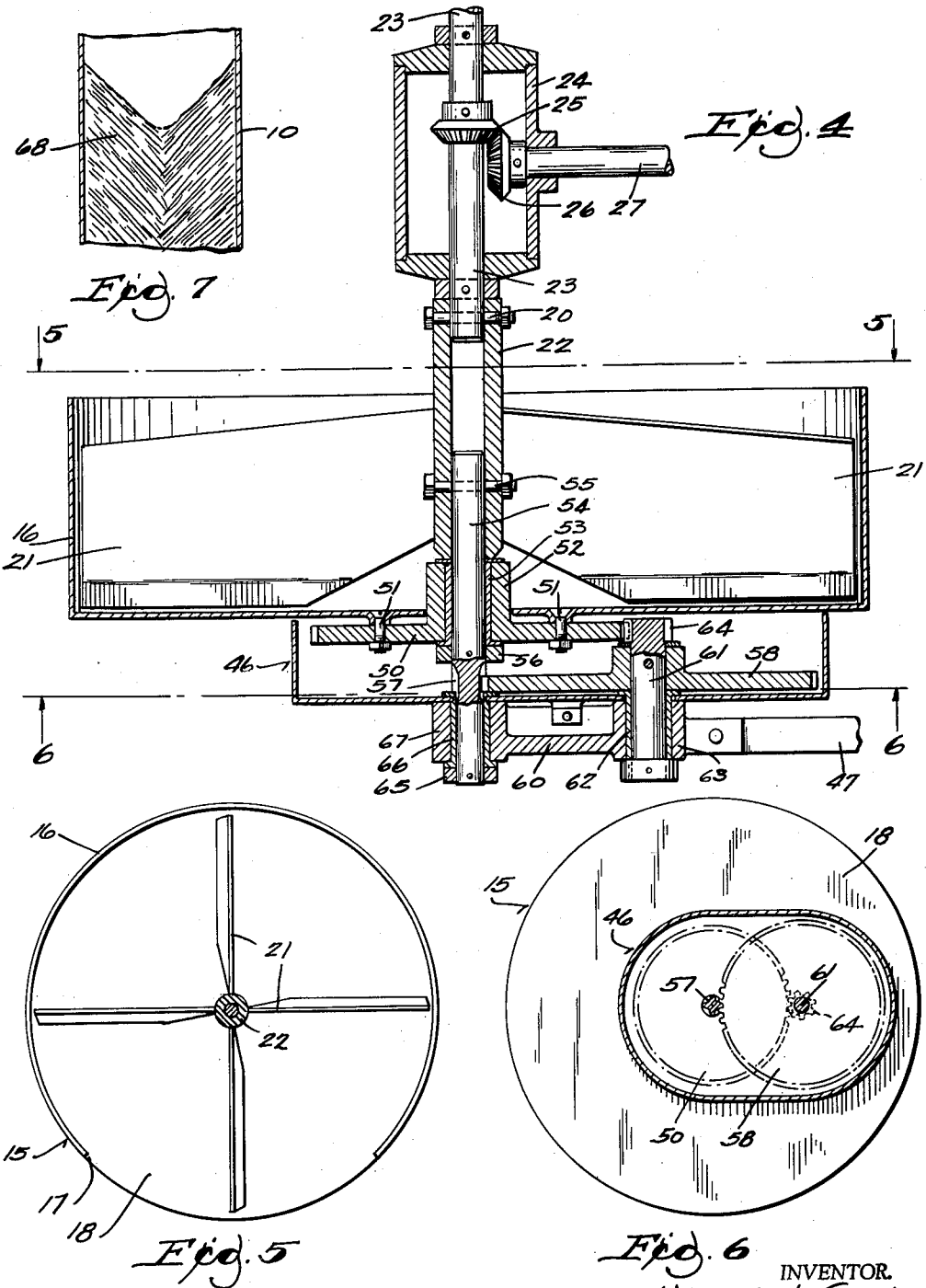

This invention relates to a distributor for evenly filling silos, or the like.

When filling silos and the like, it is desirable that the silage or like material be spread evenly through the cross section of the silo. Desirably the silage should be deposited near the wall of the silo so that it will tend to flow centrally from the wall toward the center of the silo and form inverted cone-shaped stratas of silage therewithin. In this way, fluids tend to flow toward the center of the silo.

It is also desirable to avoid separation of the fines from the heavier material, thus to maintain a uniform consistency of the silage throughout the silo. Accordingly, when silage is removed from the silo, it will have the same consistency and distribution of fines and heavies as when it was loaded into the silo.

According to the present invention, the distributor consists of a material confining housing which has a side outlet directed generally toward the silo wall. Within the housing there is a material impeller which rotates at a relatively high speed to discharge the silage in a stream through the side outlet of the housing. The housing is also rotated, but at a relatively slow speed, so that the stream issuing from the housing is played toward the wall of the silo to deposit all silage at the wall from whence it may flow by gravity toward the center of the silo to form the distribution pattern aforesaid. By keeping the silage relatively compactly in a stream, the fines do not separate from the heavies. If, as is the usual case, the distributor is positioned at or near the center of the silo, the stream will be projected radially toward the silo wall as the housing rotates on the center axis of the silo.

The distributor may be hung as an independent unit from the center of the silo roof or may be suspended beneath an elevated silo unloader subject to be removed therefrom when the silo unloader is in operation.

Other objects, advantages and features of the invention will appear from the following disclosure in which:

FIG. 1 is a fragmentary cross section taken through a silo provided with the silage distributor embodying the invention.

FIG. 2 is a fragmentary plan view thereof, the wall of the silo being shown in cross section.

FIG. 3 is a fragmentary perspective view of the silage distributor per se.

FIG. 4 is a vertical cross section taken through the silage distributor and a portion of its actuating mechanism.

FIG. 5 is a plan view of the silage distributor per se and viewed along the line 5—5 of FIG. 4.

FIG. 6 is a cross section taken along the line 6—6 of FIG. 4.

FIG. 7 is a reduced fragmentary axial cross section taken through a silo filled with silage distributed by the silage distributor of the present invention.

A typical silo has a wall 10 with a domed roof 11, from which the apparatus of the present invention may be suspended by a chain 12. The silo dome 11 has an opening 13, through which the spout 14 of a conventional silage filling blower projects. In the absence of any silage distributing means, the spout 14 would simply deposit silage at one side of the silo.

Silage as thus deposited would tend to build up along the adjacent wall, possibly unbalancing the silo and creating a non-uniform distribution of silage therewithin.

According to the present invention, however, chain 12 suspends a silage distributor 15. The silage distributor consists of a housing wall or shroud 16 having a side outlet 17. The distributor 15 also has a floor 18. Rotatable within the wall 16 is an impeller consisting of radial blades 21 fixed as by welding or the like on a tubular drive shaft 22.

The tubular drive shaft 22 is releasably connected by bolt 20 to and receives driving torque from a drive shaft 23. Shaft 23 also serves as a link suspending distributor 15 from the hanger 19, which in turn is suspended by chain 12.

Beneath hanger 19, drive shaft 23 passes through a power take-off gear box 24 having therewithin bevel gears 25, 26. Gear 26 is on horizontal drive shaft 27 for an auger conveyor 28 which conveys silage from the spout 14 to the distributor 15. The auger conveyor 28 has a trough 31 hung by bracket hooks 32 on the wall 10 of the silo and adjacent the door 13 of the dome 11.

Shaft 23 is suspended from hanger 19 in thrust bearings 33, 45. Shaft 23 has a pulley 34 by which the shaft is rotated under power of the electric motor 35 through belt 36. The motor 35 is mounted on a bracket 37 supported on a platform 38 connected to hanger 19. The end of the auger trough 31 near the center of the silo receives support from the platform 38 and hanger 19 through the bracket 41. The hanger 19 and platform 38 are held against rotation by the torque arm 42 which extends laterally into the opening 13 of the dome 11 and is connected through vertical mast 43 with the trough 31 of the auger conveyor 28. The trough 31 may have an intermediate support from the arm 42 by means of suspension bracket 44. Accordingly, the apparatus is held against rotation about the center axis of the silo. Shaft 23 is free to rotate as powered by the motor 35 and will support the distributor 15 through the thrust bearings 33, 45.

Beneath the floor 18 of the distributor 15, there is a gear box 46 which is held against rotation by the torque arm 47 which is fastened to the bottom of trough 31. Gear box 46 contains a large gear 50, which is fixed to the said bottom 18 by bolts 51. The gear 50 has a hollow hub 52 with a sleeve bearing 53 in which an extension 54 of shaft 23 is rotatable. Shaft extension 54 is fastened by bolt 55 to the tubular drive shaft 22 and rotates therewith.

Shaft extension 54 has a thrust collar 56 connected thereto and by which the housing 16 is supported from the shaft 23 through tubular shaft 22 and shaft extension 54. Below collar 56, shaft extension 54 is provided integrally with a pinion 57 which meshes with gear 58 which is fixed to and which rotates on the axis of jack shaft 61 which is journalled in sleeve bearing 62 mounted in socket 63 of a bearing bracket 60 connected to the torque arm 47.

The upper end of jack shaft 61 is provided with an integral pinion 64 which meshes with the teeth on the gear 50 to rotate the housing 16.

The lowermost end of shaft extension 54 rotates in bearing 66 in socket 67 of bracket 60. Said end is also provided with a thrust collar 65 which supports the gear box 46.

The ratio of the gears in box 46 is desirably such that housing 16 is driven by gear 50 to rotate very slowly, for example one to three r.p.m. Impeller blades 21 are rotated at a relatively high speed, for example two or three hundred r.p.m. The gears in box 46 can be arranged to rotate the housing shell 16 in the same direction as the impeller 21, or opposite thereto.

Accordingly, silage which is delivered to the silo through spout 14 and which is conveyed to the distributor 15 by the auger conveyor 28 will be centrifugally discharged through the side outlet 18 in housing shell 16 in a stream which will be slowly rotated to evenly distribute the silage therewithin. The distribution of silage 68 is indicated in FIGURE 7.

Where the spout 14 is long enough to reach the distributor 15, auger conveyor 28 may be omitted. In such a case, torque arm 47 is connected directly to the torque arm 42, through the bracket 44.

In the embodiment illustrated, the distributor 15 may be removed from the drive shaft 23 by releasing the bolt 20 and detaching the torque arm 47 from the auger conveyor 28. The remaining apparatus may then be used as a silo unloader.

I claim:

1. A distributor for evenly filling silos or the like into which silo filling material is discharged by silo filling means, said distributor comprising a material confining housing shell having a side outlet directed generally toward the silo wall, material impelling means within the shell for discharging material in a stream through said outlet toward the silo wall, and means for continuously rotating said shell to continuously rotate said stream with respect to the silo and uniformly filling the same, said material impelling means comprising a rotary impeller and means for rotating the impeller at a rate greatly exceeding shell rotation, the means for rotating the impeller and the means for rotating the shell comprising a motor, a motor driven shaft coaxial with the shell and impeller, and speed differenting means interconnecting the shaft with the shell and impeller to drive the same at different rates of speed.

2. The distributor of claim 1 in which the said speed differentiating means comprises a direct connection from the shaft to the impeller and a speed reducing connection from the shaft to the shell.

3. A silage distributor for use with a silo or the like having silo filling means, said distributor comprising a material confining housing shell having a side outlet directed generally toward the silo wall, a rotary impeller within said housing shell for discharging material in a stream through said outlet, power means for rotating the impeller at a high rate of speed and the housing shell at a low rate of speed to rotate said stream with respect to the silo, support means to support the distributor substantially at the center of the silo, said power means comprising a motor, a motor driven shaft coaxial with the impeller and housing shell and speed differentiating means interconnecting the shaft with the housing shell and impeller to drive the same at different rates of speed.

4. The apparatus of claim 3 in further combination with a conveyor to convey material from the silo filling means to the distributor, and a power take-off connection from said shaft to said conveyor.

5. The device of claim 3 in which the speed differentiating means comprises a speed reducing gear set and a gear box therefor beneath said housing shell and torque arm means for restraining rotation of said gear box.

References Cited by the Examiner
UNITED STATES PATENTS

| | | |
|---|---|---|
| 565,068 | 8/96 | Dornfeld. |
| 2,219,954 | 10/40 | Geiger et al. |
| 2,497,406 | 2/50 | Graham. |
| 2,860,790 | 11/58 | Erickson et al. |

HUGO O. SCHULZ, *Primary Examiner.*

ERNEST A. FALLER, *Examiner.*